US012046990B1

(12) United States Patent
Xu et al.

(10) Patent No.: US 12,046,990 B1
(45) Date of Patent: Jul. 23, 2024

(54) MULTI-PHASE HIGH-PRECISION CURRENT SHARING CONTROL METHOD APPLIED TO CONSTANT ON-TIME CONTROL

(71) Applicant: SOUTHEAST UNIVERSITY, Nanjing (CN)

(72) Inventors: Shen Xu, Nanjing (CN); Haiqing Zhang, Nanjing (CN); Yujie Liu, Nanjing (CN); Ruizhi Wang, Nanjing (CN); Yuan Gao, Nanjing (CN); Yongjia Li, Nanjing (CN); Weifeng Sun, Nanjing (CN); Longxing Shi, Nanjing (CN)

(73) Assignee: SOUTHEAST UNIVERSITY, Nanjing (CN)

( * ) Notice: Subject to any disclaimer, the term of this patent is extended or adjusted under 35 U.S.C. 154(b) by 0 days.

(21) Appl. No.: 18/641,384

(22) Filed: Apr. 21, 2024

Related U.S. Application Data

(63) Continuation of application No. PCT/CN2023/122090, filed on Sep. 27, 2023.

(30) Foreign Application Priority Data

Nov. 3, 2022 (CN) .......................... 202211368355.7

(51) Int. Cl.
*H02M 1/08* (2006.01)
*H02M 1/00* (2006.01)
*H02M 3/158* (2006.01)

(52) U.S. Cl.
CPC ......... *H02M 1/082* (2013.01); *H02M 1/0025* (2021.05); *H02M 3/1586* (2021.05)

(58) Field of Classification Search
CPC ... H02M 1/0025; H02M 1/082; H02M 3/1586
See application file for complete search history.

(56) References Cited

U.S. PATENT DOCUMENTS

2018/0351452 A1* 12/2018 Clavette ................ H02M 1/084
2020/0036287 A1   1/2020 Peretz
(Continued)

FOREIGN PATENT DOCUMENTS

| CN | 105636303 A | 6/2016 |
|---|---|---|
| CN | 106257812 A | 12/2016 |

(Continued)

*Primary Examiner* — Jue Zhang
*Assistant Examiner* — Lakaisha Jackson
(74) *Attorney, Agent, or Firm* — Bayramoglu Law Offices LLC

(57) ABSTRACT

A multi-phase high-precision current sharing control method applied to constant on-time control is provided, wherein a current difference between continuously sampled current of each line and mean current is processed by a PI compensation module and a low-pass filter module to obtain on-time regulation data. A high bit of the regulation data controls the value of counter reference $V_{ref}$ in an on-time control module, and a low bit controls the length of an enabled delay line in a delay line module. The counter timing control of the on-time control module is combined with the delay line timing control of the delay line module to improve the control precision of a DPWM. The method takes COT control of a Buck converter as a typical application. Compared with a multi-phase COT controller without a current-sharing mechanism, the method can improve the stability and reliability of the system.

3 Claims, 5 Drawing Sheets

(56) References Cited

U.S. PATENT DOCUMENTS

| | | | | |
|---|---|---|---|---|
| 2020/0389092 A1* | 12/2020 | Zhan | ............... | H02M 3/1584 |
| 2022/0131464 A1* | 4/2022 | Hosotani | ............ | H02M 1/0048 |
| 2023/0110617 A1* | 4/2023 | Yang | ................ | H02M 1/0003 323/266 |

FOREIGN PATENT DOCUMENTS

| | | |
|---|---|---|
| CN | 109004840 A | 12/2018 |
| CN | 115566898 A | 1/2023 |

\* cited by examiner

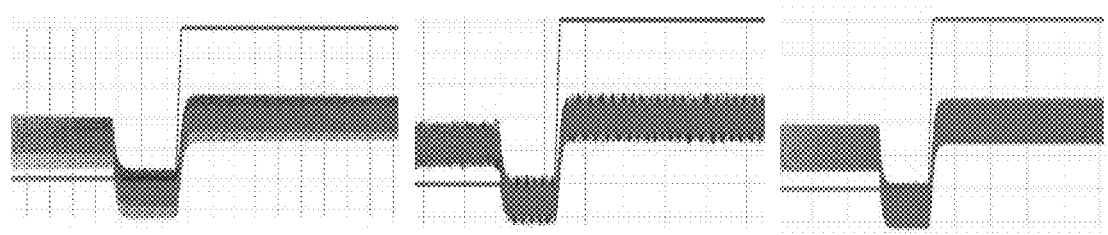
without current sharing
FIG. 7A
after non-high-precision current sharing
FIG. 7B
after high-precision current sharing
FIG. 7C
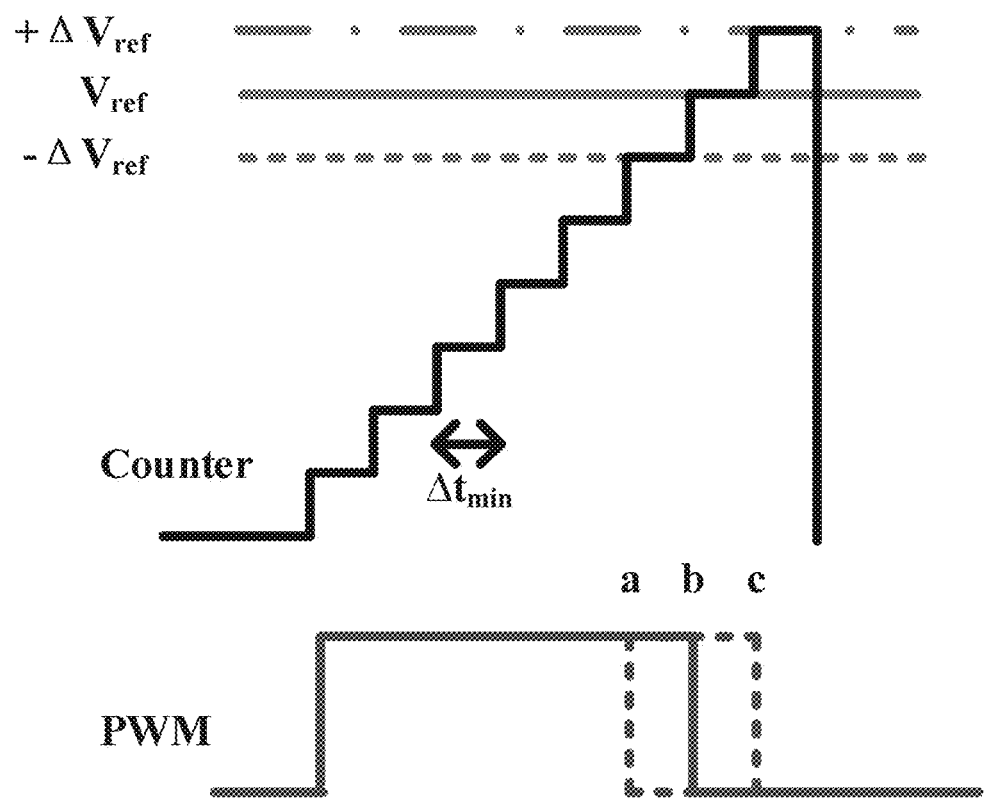
FIG. 8

MULTI-PHASE HIGH-PRECISION CURRENT SHARING CONTROL METHOD APPLIED TO CONSTANT ON-TIME CONTROL

CROSS REFERENCE TO THE RELATED APPLICATIONS

This application is a continuation application of International Application No. PCT/CN2023/122090, filed on Sep. 27, 2023, which is based upon and claims priority to Chinese Patent Application No. 202211368355.7, filed on Nov. 3, 2022, the entire contents of which are incorporated herein by reference.

TECHNICAL FIELD

The invention relates to switching power supplies, in particular to a high-precision digital current sharing control method for a multi-phase constant on-time (COT) controller.

BACKGROUND

At present, voltage regulation modules are gradually developing towards an increase in current and power consumption. This trend brings more and more application scenarios for multi-phase high-current circuits. Multi-phase COT is a mainstream control method at present. It has the characteristics of high light load efficiency, large system bandwidth, and simple compensation network. When a multi-phase COT circuit is working, multiple lines may not work in a completely consistent state, and there are differences in current and power consumption. These differences may affect the reliability and stability of a power system. The main reasons for this inconsistency are as follows: First, due to phase staggering during startup, the on-time of current is inconsistent in multiple lines, and there is an initial current difference. Second, there are deviations in the parameters of power modules of multiple lines, such as slight differences in RC parameters and drain-source resistance Rds inside gates, causing inductor current deviation during operation. In order to ensure that the multiple lines can operate in an ideal working state, it is required to ensure balanced inductor current in the multiple lines.

Most of the present current sharing methods are directed to analog control, such as output impedance and master-slave setting. However, these methods cannot be adapted to digital COT controlled circuits because in a digital control system, a digital pulse width modulator (DPWM)waveform generator module is responsible for converting the duty cycle signal into a corresponding switch tube control signal, unlike an analog circuit in which a sawtooth wave generator is compared with a compensated voltage signal to generate a drive signal for the metal-oxide-semiconductor (MOS) pin. According to its basic principle, a counter counts based on a clock signal, produces an output similar to a sawtooth wave, and compares this counter value with a given reference $V_{ref}$ as indicated by the straight line in FIG. 8. At the beginning, the counter is reset to 0 and the reference is greater than the counter value. In this case, a drive signal output is high. When the counter value exceeds the reference, the drive signal output is low, that is, it becomes low level at b, so a pulse width modulator (PWM) waveform as shown in FIG. 8 is output.

A traditional digital current sharing module regulates the reference $V_{ref}$. By increasing the value of $V_{ref}$, the on-time of a line is increased, thereby increasing the inductor current of this line. By decreasing the value of $V_{ref}$, the on-time of a line is decreased, thereby decreasing the inductor current of this line. However, with this digital current sharing control method, the minimum change in duty cycle is one clock cycle, which makes the regulation granularity coarse and prone to overmodulation and the like. In order to obtain better current sharing effects, a high-precision current sharing method is desired to precisely regulate on-time.

SUMMARY

Technical problem: In order to improve the operating conditions of the multi-phase COT circuit and enhance the reliability of the circuit, the invention provides a multi-phase high-precision current sharing control method applied to constant on-time control.

Technical solution: In order to achieve the above objective, the invention adopts a multi-phase high-precision current sharing control method applied to constant on-time control. In a specific application in a BUCK converter, its basic idea is to process a current difference between the continuously sampled current of each line and mean current by a proportional-integral (PI) compensation module and a low-pass filter module to obtain on-time regulation data, where a high bit of this regulation data controls the value of $V_{ref}$ and a low bit controls the length selection of a delay line. The combination of a counter and a delay line improves the control precision of a DPWM.

In a steady state of digital COT control, because loads are in a stable state, the period remains basically unchanged, and it can be regarded as a fixed-frequency control system.

The control method is based on the following modules: a current sampling module, a low-pass filter module, a PI compensation module, a state transfer module, a delay line module, and an on-time control module, wherein the current sampling module, the low-pass filter module, and the PI compensation module are connected in sequence; the current sampling module receives current data of a line and mean current, and transfers a processing result to the low-pass filter module and the PI compensation module in sequence to obtain an on-time regulation signal; the above three modules are given enable signals by the state transfer module to control their working timing; the delay line module and the on-time control module jointly function as a DPWM; each time the PWM is pulled high, the regulation signal given by the first three modules is read; according to the signal, the on-time control module controls the on-time of the delay line module, and finally the delay line module outputs a PWM pull-down signal;

a current difference between the continuously sampled current of each line and the mean current is processed by the PI compensation module and the low-pass filter module to obtain on-time regulation data; a high bit of the regulation data controls the value of a counter reference $V_{ref}$ in the on-time control module, and a low bit controls the length of an enabled delay line in the delay line module. The counter timing control of the on-time control module is combined with the delay line timing control of the delay line module to improve the control precision of the DPWM.

The current sampling module is configured to sample the difference between the mean current and the current of each line to obtain an input for the following filter;

the low-pass filter module is configured to perform a low-pass filter operation on an input signal to filter out interference of high-frequency ripples;

the PI compensation module is configured to receive the input from the current sampling module and perform PI filtering operation on the input to eliminate a steady-state error of the system by virtue of poles of a PI network and output an on-time regulation signal;

the delay line module is configured to, when enabled by the on-time control module, output the control signal as a turn-off signal of MOS switching signals after different delays according to the low bit of the on-time regulation data to turn off a power stage upper-side driver;

the state transfer module is configured to control the state of the system and enable various modules and is implemented using a finite state machine; and the on-time control module is configured to regulate the reference of the DPWM counter according to a high bit and sign bit of an output from the filter module, and enable the delay line module when the counter counts to the reference.

The current sharing control method specifically comprises:

step 1: sampling, by the current sampling module, the current difference signal between the mean current and the current of each line;

wherein, current data of each line is sampled by an analog-to-digital converter (ADC) module and mean current data is obtained by adding and shifting the current data of multiple lines; since a changing frequency of these data is a sampling frequency of the ADC module, direct use of these data causes metastable conditions due to insufficient setup time in a digital circuit, affecting the work of following modules; a lower-frequency clock is used to control a register, a mean current signal $i_{Lave}$ and a current signal $i_{Li}$ of a line are registered on a rising edge of the clock and subtracted to obtain $i_{Lave}$-$i_{Li}$, which is a signal that needs to be processed later;

step 2: allowing the current difference signal to pass through the low-pass filter module to remove ripple interference;

wherein, since a switching power supply works by performing high-frequency switching on an input direct current (DC) voltage and then rectifying and filtering the voltage for output, there are inherent high-frequency current ripples in current; the ripples interfere with the output, so the low-pass filter module needs to be added to filter out high-frequency signals; in this method, digital filtering is used for filtering; s-domain parameters of the designed low-pass filter are bilinearly converted to obtain z-domain parameters; after expansion, an expression equation is obtained; a current output is calculated based on a last sampled input, a current sampled input and a last output;

step 3: after the signal is processed by the low-pass filter module, allowing the signal to pass through the PI compensation module to eliminate the steady-state error of the system and obtain on-time regulation data;

wherein, since the DC gain of a power stage system is not very large, an error occurs in a steady-state output, and output data deviate from expected data; to eliminate this deviation, a zero pole is added to the system, which can increase a steady-state gain; the pole is provided by the PI compensation module, and the implementation process is similar to the implementation of the low-pass filter module described above;

step 4: counting, by the on-time control module, a corresponding time according to the on-time regulation data;

wherein, in the steady state, the system has a default number of on-clock cycles $V_{ref}$ by which the regulation needs to be performed; when the regulation data is positive, $V_{ref}$ is directly added to a high-bit part of the regulation data to obtain a new on-time counter reference, and a low-bit part of the regulation data is directly transferred to the delay line module; when the regulation data is negative, the high-bit data of the regulation data is directly subtracted from $V_{ref}$ to obtain a new on-time counter reference; the low-bit data of the regulation data is subtracted from a maximum regulation input for the delay line to obtain new data and the new data is transferred to the delay line module; when the PWM is pulled high, the counter of the on-time control module starts to work; when counting to the counter reference, the counter stops counting and enables the delay line module connected to the counter;

step 5: performing, by the enabled delay line module, a specific delay based on the low-bit data of the on-time regulation data and outputs a MOS turn-off signal, thus completing the current sharing regulation;

wherein, after being enabled, the delay line module enables a corresponding number of delay units according to the regulation data given by the on-time regulation module, wherein the delay time of each delay unit is fixed, and when the delay time of the delay units is reached, the delay line module outputs the MOS turn-off signal.

Beneficial effect: Compared with the prior art, the invention has the following advantages:

A digital high-precision current sharing control algorithm based on the COT circuit used in the invention takes the COT control of the Buck converter as a typical application. Compared with a multi-phase COT controller without a current-sharing mechanism, it can make the system, operating in a steady state, ensure the consistent DC component of inductor current in multiple lines, thereby improving the stability and reliability of the system.

A transfer function of the current sharing module in the digital high-precision current sharing control algorithm adopted by the invention has a zero pole, which reduces the steady-state error of the current sharing module.

The digital high-precision current sharing control algorithm used in the invention includes a low-pass filter module, which avoids the impact of current ripples on the sampled data.

The digital high-precision current sharing control algorithm used in the invention uses a delay line for delay, so that the control precision is no longer limited by the system clock, thereby achieving a higher control precision.

The digital high-precision current sharing control algorithm used in the invention is completely implemented digitally and does not require additional analog circuits.

BRIEF DESCRIPTION OF THE DRAWINGS

FIGS. 7A-7C show simplis simulation waveform diagrams of the invention applied to a two-phase BUCK converter. FIG. 7A: two-phase current without current sharing; FIG. 7B: two-phase current after non-high-precision current sharing; FIG. 7C: two-phase current after high-precision current sharing.

FIG. 8 shows the working principle of a DPWM module.

DETAILED DESCRIPTION OF THE EMBODIMENTS

To illustrate the invention more clearly, the technical solution of the invention will be further explained below in conjunction with the accompanying drawings.

Figure 1:
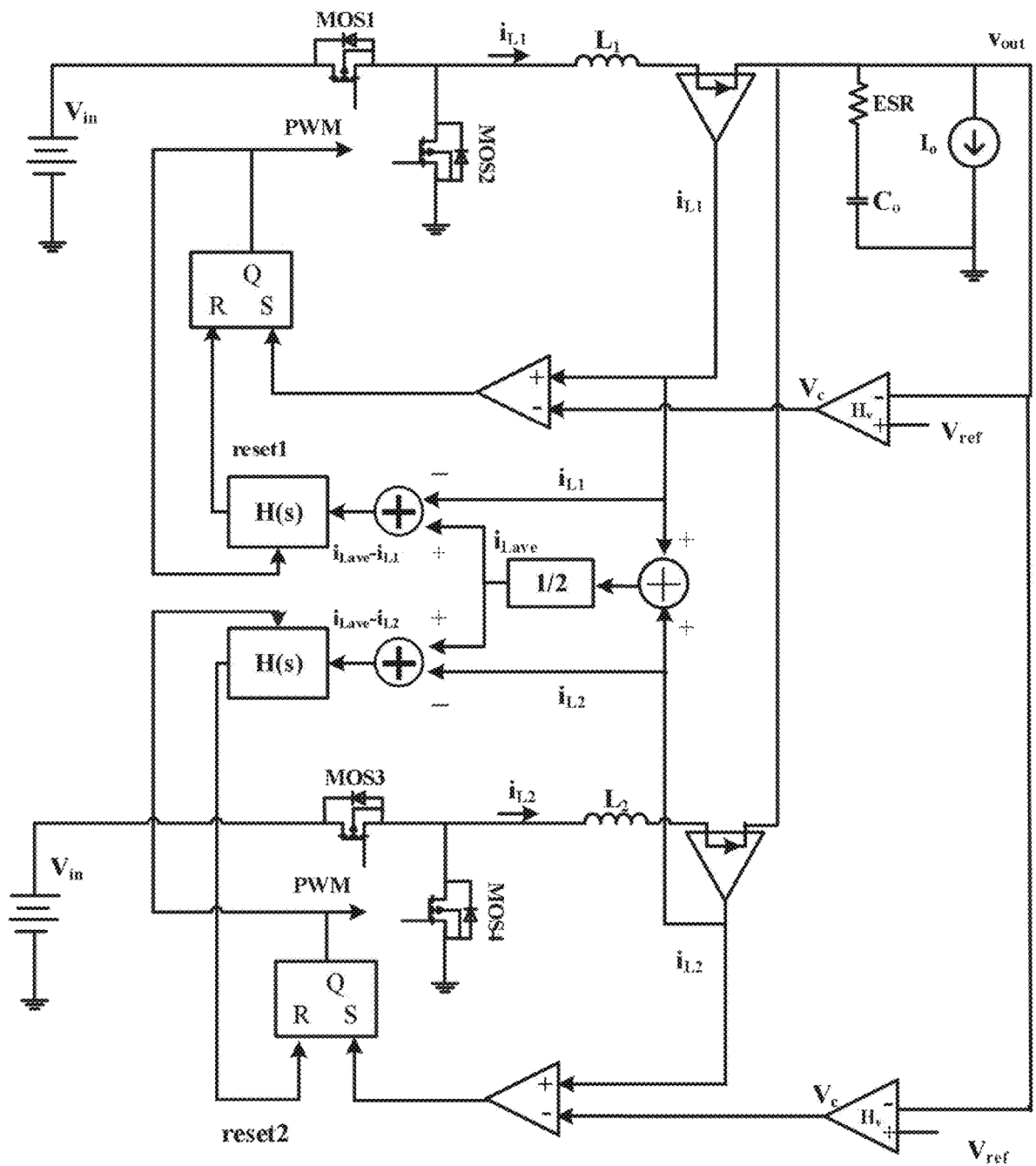
FIG. 1 is a block diagram of a two-phase COT control system using a current sharing module of the invention, where H(s) represents a designed current sharing module.

FIG. 1 is a system structure block diagram of the application of a digital current sharing algorithm of the invention in a two-phase current COT control Buck converter. Given that, in a steady state, the operating period of the system is T, the period of a system clock is $T_{clk}$ and a MOS transistor is turned on by default for $V_{ref}$ system clock periods in a switching cycle. The inductor current of each line is sampled to obtain the digital quantities of current of two lines, $i_{L1}$ and $i_{L2}$. After summing the digital quantities of the two lines and undergoing a gain of ½, the mean current $i_{Lave}$ of the two lines is obtained. The current of each line is subtracted from the mean current to obtain current difference signals $i_{Lave}$-$i_{L1}$ and $i_{Lave}$-$i_{L2}$. The current difference signal of each line passes through a current sharing module, and on-time regulation data can be obtained. Based on this on-time regulation data and in combination with a PWM turn-on signal, a reset signal of a SR flip-flop is given to turn on the MOS and regulate the inductor current, thus completing current sharing regulation.

Figure 2:
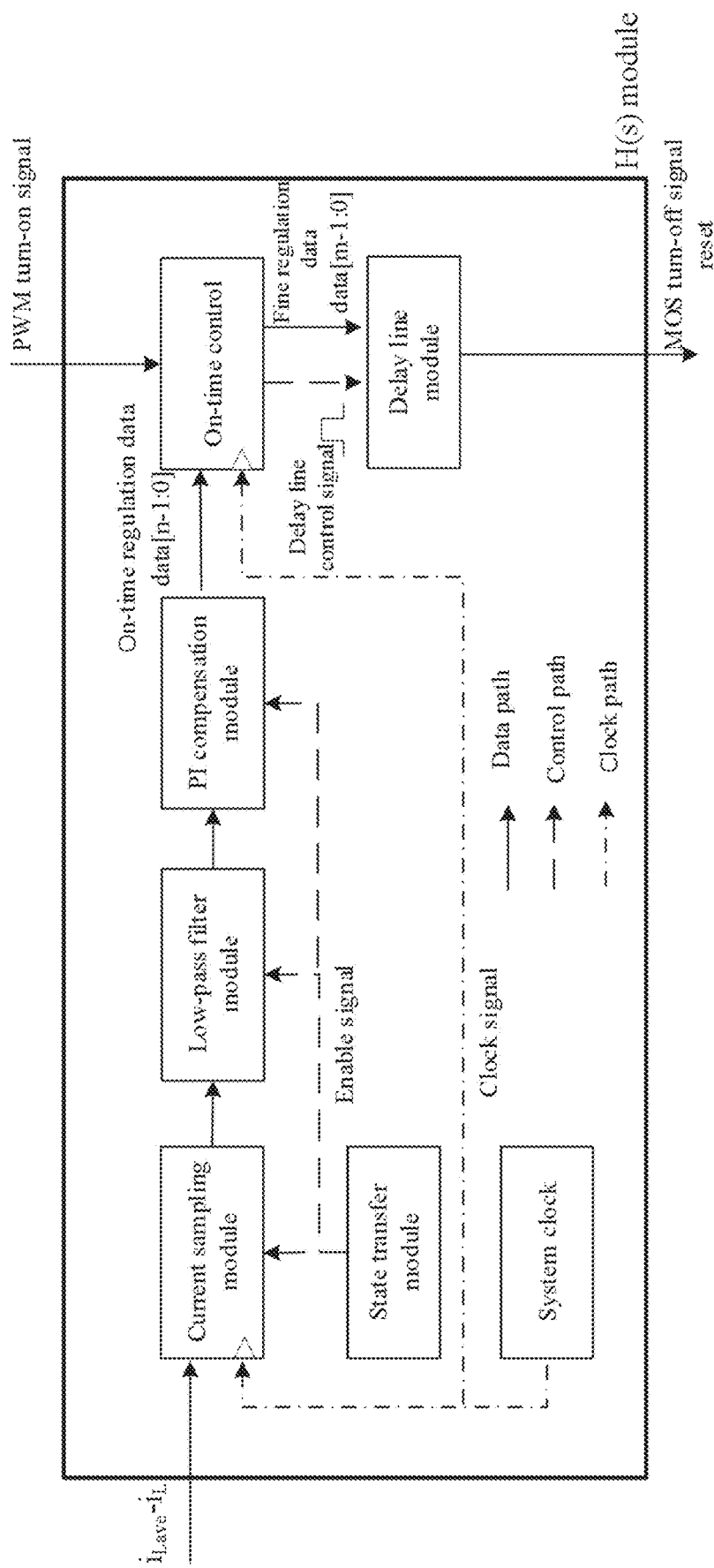
FIG. 2 is a block diagram showing the internal structure of the current sharing module H(S).

FIG. 2 shows the internal structure of the current sharing module. Taking Line 1 as an example, the current difference signal $i_{Lave}$-$i_{L1}$ is input to a current sampling module, and sampled data is obtained based on a rising edge of a system clock. Since there are ripples in the two-phase current, the sampled data needs to be processed by a low-pass filter module and a PI compensation module, and then an on-time regulation data data[n-1:m] can be obtained. The regulation data is divided into two parts: coarse regulation data[n-1:m] and fine regulation data[m-1:0]. The coarse regulation part regulates the number of ON cycles through an on-time control module. According to the coarse regulation signal data[n-1:m], an enable signal for a delay line is given, and the fine regulation data is sent to a delay line module. The fine regulation part is controlled by the delay line module to complete the high-precision on-time regulation, and a MOS turn-off signal is given finally.

This embodiment performs low-pass filtering and PI filtering operations on the sampled signals. The reason why the low-pass filter module is needed is because there are ripples in the two-phase current. This causes the sampled current difference signal to be superimposed with a ripple variation, so the sampled current difference signal needs to be filtered to remove high-frequency signals, thereby obtaining a DC component shown in FIG. 2 as an input signal. The low-pass filter module used in this solution is expressed as:

$$lowpass = \frac{2\pi wz}{s + 2\pi wp}. \qquad i$$

Since there is an inherent steady-state error in the two-phase current, a zero pole is introduced in a frequency domain to increase the DC gain and reduce the steady-state error. For this purpose, a PI filter in the following form is designed, and the filter is expressed as:

$$PI\_filter = \frac{1 + s/wz}{s}. \qquad i$$

The s-domain expressions of the low-pass filter module and the PI compensation module are bilinearly converted to obtain z-domain functions, so that discrete digital quantities can be processed. After filtering, the data regulation can be obtained as data[n-1:0]. The above is the filtering process of the sampled data.

Figure 3:
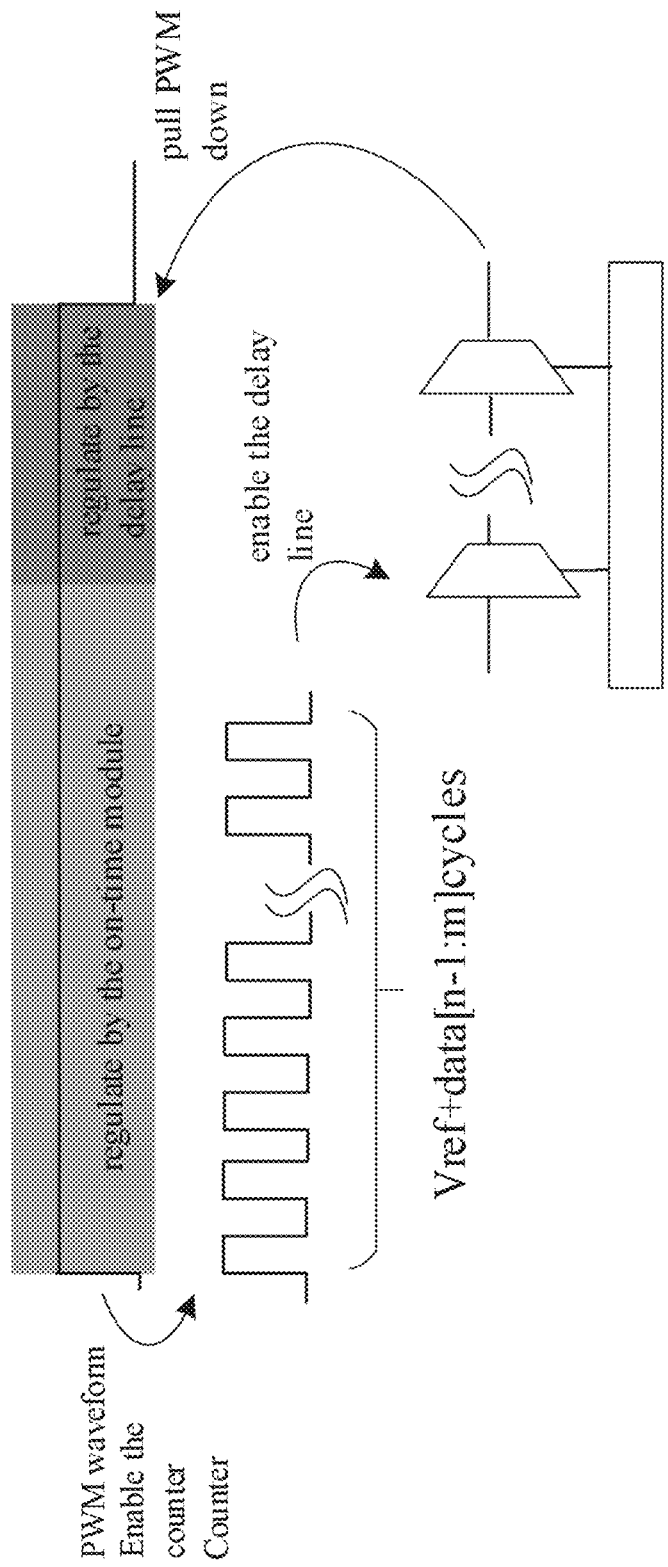
FIG. 3 is a schematic diagram of PWM control timing.

This embodiment combines a DPWM and a delay line to perform turn-on control of PWM, which not only improves the control precision, but also avoids excessive occupation of resources. The specific control timing is shown in FIG. 3. The on-time of PWM consists of two parts. One part is controlled by the traditional DPWM control method taking the system clock precision as its regulation precision. The other part is controlled by a delay line for fine control. The specific control timing is as follows: First, the above-mentioned compensation module will provide time regulation data data[n-1:0]. When the PWM wave is high-level, the counter controlled by the system clock is turned on for counting, and the counter value is the default number of on-clock cycles $V_{ref}$ plus the high-bit part data[n-1:m] of the previously calculated regulation data. When the counter counts to a predetermined counter value, the delay line module is enabled, and the low-bit part data[m-1:0] of the regulation data is also transferred to the delay line module. The delay line module contains 2m delay line units. A corresponding number of delay line units will be enabled according to the value of data[m-1:0] to control delay time.

Figure 4:
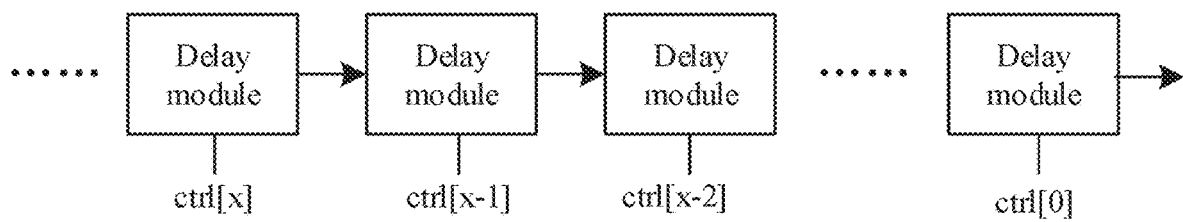
FIG. 4 is a schematic diagram of a delay line module.

In this embodiment, the delay line is composed of multiplexers MUX and can perform high-precision delay, which can reach the picosecond range. The specific delay needs to be determined according to the layout and routing. The main body of the delay line module consists of a plurality of delay line units arranged side by side, as shown in FIG. 4. The delay time is controlled by controlling each delay line unit. First, the regulation data needs to be converted. According to the regulation data, the control signal for a data[m-1:0]-th delay line module is set to be high-level, and control signals for the rest are set to be low-level, that is, One-Hot encoding is performed. Secondly, the control signal will be input to the corresponding delay unit. The high-level control signal will generate a pulse signal at an input terminal of the corresponding controlled delay line module and a fixed delay is performed through an internal series multiplexer MUX chain. The delay units controlled by the low-level control signals will only perform a fixed delay on the signal at the input terminal. Finally, after signal transfer, a turn-off signal for the PWM will be output at the data[m-1:0]th delay unit time after the delay line module is enabled, thus completing the control of PWM and waiting for the next switching cycle.

Figure 5:
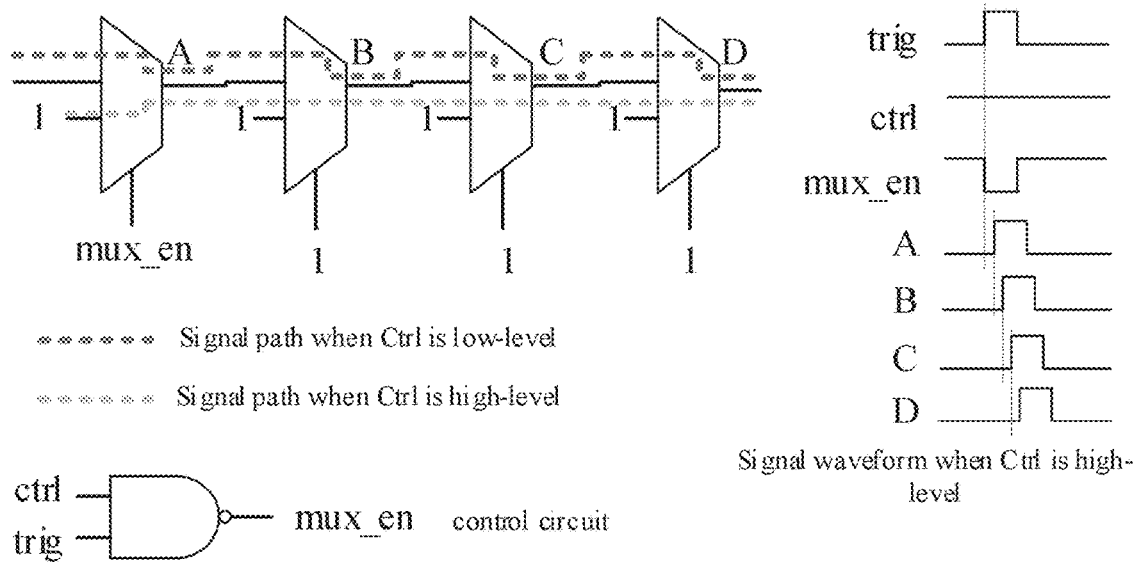
FIG. 5 is a schematic diagram of a delay unit.
Figure 6:
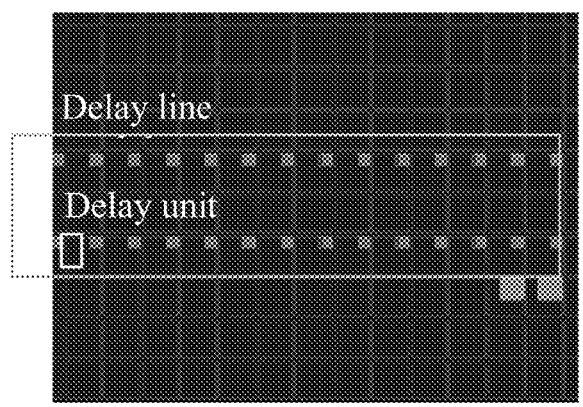
FIG. 6 is a schematic layout diagram of the delay line module.

FIG. 5 shows details of the delay unit. The main body of the delay unit includes four multiplexers MUX connected in series. The input for ports of the last three multiplexers MUX is always 1, which means that the MUX output from the previous stage can be output to the next stage through the current MUX. A strobe signal for the first MUX is controlled by mux_en. This signal is obtained by performing the NAND operation on a control signal ctrl and a trig signal, where trig is a pulse signal. This pulse signal is generated when the delay line module is enabled by the on-time regulation module. When ctrl is low, the mux_en signal is always high, that is, the MUX does not perform additional processing on the input signal for the delay unit, but only sends it to the next MUX through the inherent line delay of the current MUX. When ctrl is high, the mux_en signal is low, and it will cause an input port signal connected to the high level to pass through the MUX, thereby generating a pulse signal having a signal length controlled by the length of trig. This pulse signal will be transferred in the subsequent delay line module, and ultimately controls the MOS to be turned off. The right half of FIG. 5 shows various waveform signals when the control signal ctrl is high. Moreover, since layout and routing will also affect the delay line effect, manual layout and routing of delay units is required to ensure consistent line delays between units. This embodiment is implemented using a FPGA. FIG. 6 is a layout and routing diagram of the delay line module part on a PFGA.

FIGS. 7A-7C show Simplis simulation waveform diagrams of two-phase COT control, which are a simulation waveform diagram without using current sharing, a simulation waveform diagram without using high-precision current sharing, i.e., without using sampling-delay line method, and a simulation waveform diagram after high-precision current sharing, respectively. By comparison, it can be seen that this current sharing method can maintain the same DC component of all the inductors in the steady state, and the use of delay blocks can reduce the fluctuation of the output voltage. Moreover, this method is suitable for any number of lines.

The above are further detailed descriptions of the invention in combination with the drawings. It cannot be concluded that the specific implementation of the invention is limited to these descriptions. The above are only preferred embodiments of the invention. For those skilled in the art, any modifications, equivalent substitutions, improvements, etc. made without departing from the principles of the invention should be included in the scope of the invention.

What is claimed is:

1. A multi-phase high-precision current sharing control method applied to a constant on-time control, the multi-phase high-precision current sharing control method being based on the following modules: a current sampling module, a low-pass filter module, a proportional-integral (PI) compensation module, a state transfer module, a delay line module, and an on-time control module, wherein the current sampling module, the low-pass filter module, and the PI compensation module are connected in sequence; the current sampling module receives current data of a line and a mean current, and transfers a processing result to the low-pass filter module and the PI compensation module in sequence to obtain an on-time regulation signal; the current sampling module, the low-pass filter module, and the PI compensation module are given enable signals by the state transfer module to control a working timing of the current sampling module, the low-pass filter module, and the PI compensation module; the delay line module and the on-time control module jointly function as a digital pulse width modulator (DPWM); each time a pulse width modulator (PWM) is pulled high, the on-time regulation signal given by the current sampling module, the low-pass filter module, and the PI compensation module is read; according to the on-time regulation signal, the on-time control module controls an on-time of the delay line module, and finally the delay line module outputs a PWM pull-down signal;

a current difference between a continuously sampled current of each line and the mean current is processed by the PI compensation module and the low-pass filter module to obtain on-time regulation data; a high bit of the on-time regulation data controls a value of a counter reference $V_{ref}$ in the on-time control module, and a low bit of the on-time regulation data controls a length of an enabled delay line in the delay line module; a counter timing control of the on-time control module is combined with a delay line timing control of the delay line module to improve a control precision of the DPWM.

2. The multi-phase high-precision current sharing control method applied to the constant on-time control according to claim 1, wherein the current sampling module is configured to sample a difference between the mean current and a current of each line to obtain an input for the following filter;

the low-pass filter module is configured to perform a low-pass filter operation on an input signal to filter out an interference of high-frequency ripples;

the PI compensation module is configured to receive the input from the current sampling module and perform a PI filtering operation on the input to eliminate a steady-state error of a system by virtue of poles of a PI network and output the on-time regulation signal;

the delay line module is configured to, when enabled by the on-time control module, output a control signal as a turn-off signal of metal-oxide-semiconductor (MOS) switching signals after different delays according to the low bit of the on-time regulation data to turn off a power stage upper-side driver;

the state transfer module is configured to control a state of the system and enable various modules and is implemented using a finite state machine; and the on-time control module is configured to regulate a reference of a DPWM counter according to a high bit and a sign bit of an output from the low-pass filter module, and enable the delay line module when the DPWM counter counts to the reference.

3. The multi-phase high-precision current sharing control method applied to the constant on-time control according to claim 1, wherein the multi-phase high-precision current sharing control method comprises:

step 1: sampling, by the current sampling module, a current difference signal between the mean current and a current of each line;

wherein, current data of the each line is sampled by an analog-to-digital converter (ADC) module, and mean current data is obtained by adding and shifting the current data of the each line; since a changing frequency of the current data and the mean current data is a sampling frequency of the ADC module, a direct use of the current data and the mean current data causes metastable conditions due to an insufficient setup time in a digital circuit, affecting a work of following modules; a lower-frequency clock is used to control a register, a mean current signal $i_{Lave}$ and a current signal $i_{Li}$ of the line are registered on a rising edge of the lower-frequency clock and subtracted to obtain $i_{Lave}$-$i_{Li}$, wherein the $i_{Lave}$-$i_{Li}$ is a signal that needs to be processed later;

step 2: allowing the current difference signal to passes through the low-pass filter module to remove a ripple interference;

wherein, since a switching power supply works by performing a high-frequency switching on an input direct current (DC) voltage and then rectifying and filtering the input DC voltage for an output, there are inherent high-frequency current ripples in the current;

the inherent high-frequency ripples interfere with the output, so the low-pass filter module needs to be added to filter out high-frequency signals; in the multi-phase high-precision current sharing control method, a digital filtering is used for filtering; s-domain parameters of a designed low-pass filter are bilinearly converted to obtain z-domain parameters; after an expansion, an expression equation is obtained; a current output is calculated based on a last sampled input, a current sampled input and a last output;

step 3: after the signal is processed by the low-pass filter module, allowing a processed signal to pass through the PI compensation module to eliminate a steady-state error of a system and obtain the on-time regulation data;

wherein, since a DC gain of a power stage system is not very large, an error occurs in a steady-state output, and output data has a deviation from expected data; to eliminate the deviation, a zero pole is added to the system, wherein the zero pole increases a steady-state gain; the zero pole is provided by the PI compensation module, and an implementation process is similar to an implementation of the low-pass filter module;

step 4: counting, by the on-time control module, a corresponding time according to the on-time regulation data;

wherein, in a steady state, the system has a default number of on-clock cycles $V_{ref}$, a regulation needs to be performed on a basis of the $V_{ref}$; when the on-time regulation data is positive, the $V_{ref}$ is directly added to a high-bit part of the on-time regulation data to obtain a new on-time counter reference, and a low-bit part of the on-time regulation data is directly transferred to the delay line module; when the on-time regulation data is negative, the high-bit part of the on-time regulation data is directly subtracted from the $V_{ref}$ to obtain the new on-time counter reference; the low-bit part of the on-time regulation data is subtracted from a maximum regulation input for a delay line to obtain new data and the new data is transferred to the delay line module; when the PWM is pulled high, a counter of the on-time control module starts to work; when counting to a counter reference, the counter stops counting and enables the delay line module connected to the counter; and step 5: performing, by an enabled delay line module, a specific delay based on low-bit data of the on-time regulation data, and outputting a MOS turn-off signal, thus completing a current sharing regulation;

wherein, after being enabled, the delay line module enables a corresponding number of delay units according to the on-time regulation data given by the on-time regulation module, wherein a delay time of each of the delay units is fixed, and when the delay time of the each of the delay units is reached, the delay line module outputs the MOS turn-off signal.

* * * * *